United States Patent [19]
Smith

[11] 3,947,321
[45] Mar. 30, 1976

[54] CONTROL AND SHIM ROD ARRANGEMENT WITH MOVEABLE PLUGS

[75] Inventor: Montford H. Smith, Richland, Wash.

[73] Assignee: The United States of America as represented by the United States Energy Research and Development Administration, Washington, D.C.

[22] Filed: Apr. 2, 1946

[21] Appl. No.: 658,947

[52] U.S. Cl. ............ 176/87; 176/36 R; 176/DIG. 2
[51] Int. Cl.² ........................................ G21C 11/02
[58] Field of Search......... 204/193.3, 154.3, 154.36, 204/154.2, 154.2 R, 193.2, 193.2 R; 176/36 R, 87, DIG. 3

[56] References Cited
UNITED STATES PATENTS

| 2,708,656 | 5/1955 | Fermi et al. ................. 204/193.2 R |
| 2,806,819 | 9/1957 | Christy et al. ................ 204/193.2 R |
| 2,812,303 | 11/1957 | Daniels ........................ 204/193.2 R |

FOREIGN PATENTS OR APPLICATIONS

| 114,150 | 5/1940 | Australia ........................... 204/154.2 |
| 114,151 | 5/1940 | Australia ........................... 204/154.2 |
| 233,011 | 10/1944 | Switzerland ...................... 204/154.2 |

OTHER PUBLICATIONS

Smythe, "Atomic Energy for Military Purposes," pp. 85, 103, 104 and 177–180, Aug. 1945.

*Primary Examiner*—Samuel Feinberg
*Assistant Examiner*—Peter A. Nelson
*Attorney, Agent, or Firm*—Dean E. Carlson; Arthur A. Churm; Leonard G. Nierman

[57] ABSTRACT

This invention relates to a control and shim rod arrangement for a nuclear reactor. A second shield of concrete completely encloses a biological shield. Moveable plugs are mounted in said shield.

4 Claims, 5 Drawing Figures

Inventor:
Montford H. Smith

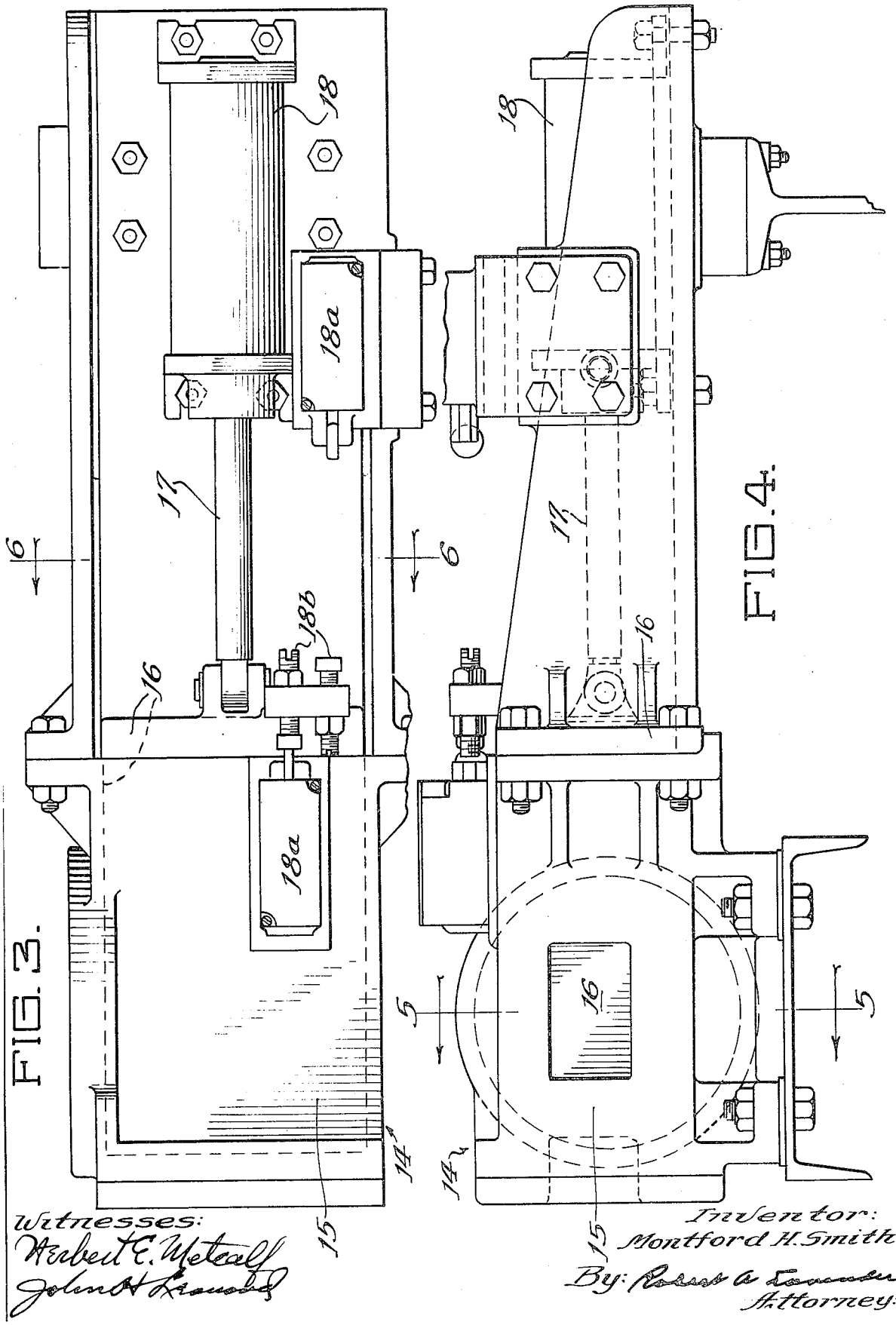

CONTROL AND SHIM ROD ARRANGEMENT WITH MOVEABLE PLUGS

This invention relates to neutronic reactors, and particularly to a control and shim rod shield room for a reactor.

As is more fully described in the copending application of Robert M. Evans Ser. No. 649,407 filed Feb. 21, 1946, in which is disclosed a neutronic reactor with which the present invention finds particular adaptation, it is necessary for control of the operation of the reactor to provide control and shim rods of neutron absorbing material which can be inserted into the reactor preferably from one lateral face, and withdrawn therefrom partially or fully as dictated by the activity of the reactor. For this purpose, suitable passages are provided in the reactor and control and shim rods are mounted for movement into and out of the passages. For further more detailed discussion of the nuclear physics and physical characteristics of neutronic reactors, particularly control and shim rods, reference is made to the copending application of Fermi and Szilard, Ser. No. 568,904, filed Dec. 19, 1944, now U.S. Pat. No. 2,708,656.

However, the rods are highly radioactive when they are withdrawn from the passages due to the high degree of neutron bombardment to which they have been subjected while in the active portion of the reactor and a problem is presented of safeguarding personnel from the radiations from the withdrawn rods and from the open ends of the passages leading into the reactor.

One of the principal objects of the present invention is to provide novel simple and effective means of shielding control and shim rods when they are in their withdrawn position.

Another object is to shield personnel from radiations from the control and shim rod passages into a reactor when the rods are fully removed for servicing or repairs.

Other objects of the present invention will be apparent from the following description wherein reference is made to the drawings, in which:

FIGS. 3 and 4 are an enlarged top plan view and an enlarged side elevational view, respectively, of a main shield gate of the present invention;

Figure 1:
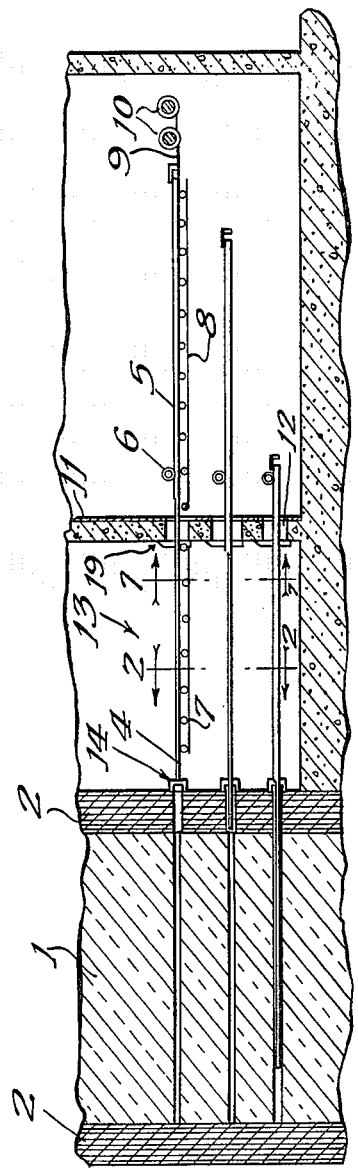
FIG. 1 is a diagrammatic vertical sectional view, partly in elevation, showing a portion of a neutronic reactor, the control rods therefor, and the shielding means of the present invention.
Figure 2:
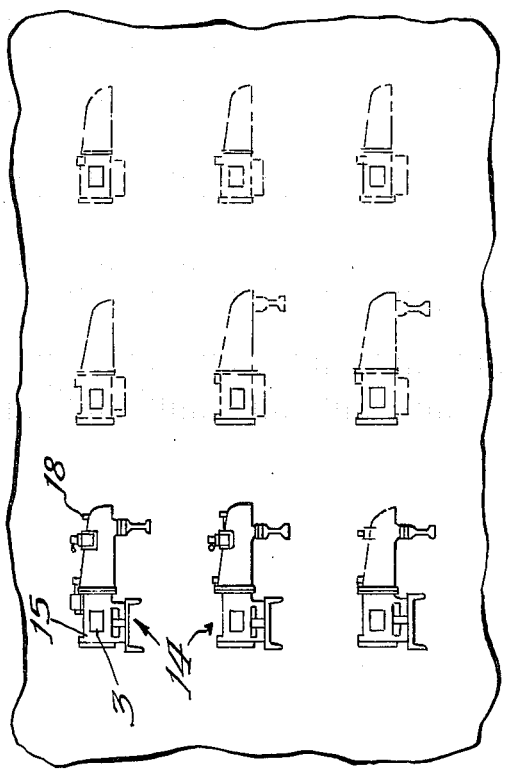
FIG. 2 is a fragmentary enlarged cross sectional view taken on line 2—2 of FIG. 1, partly in elevation.
Figure 7:
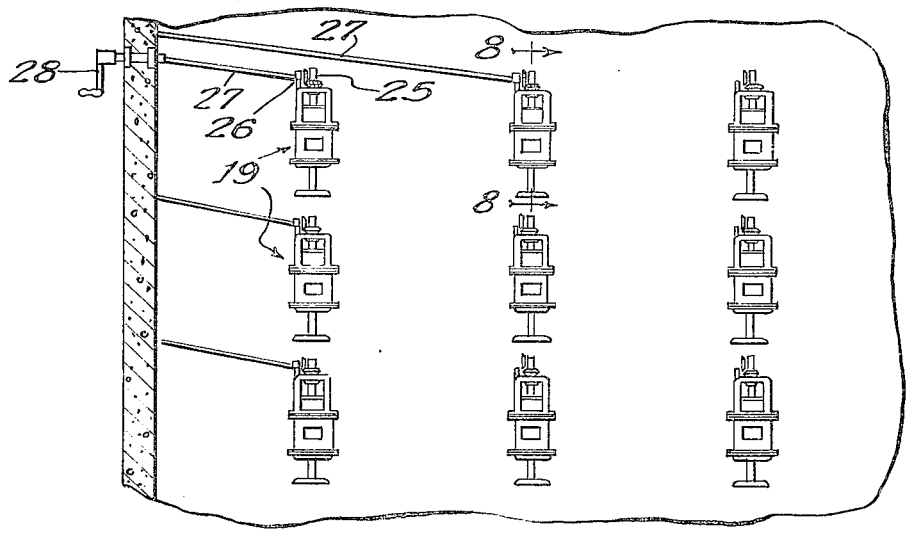
Figure 6:
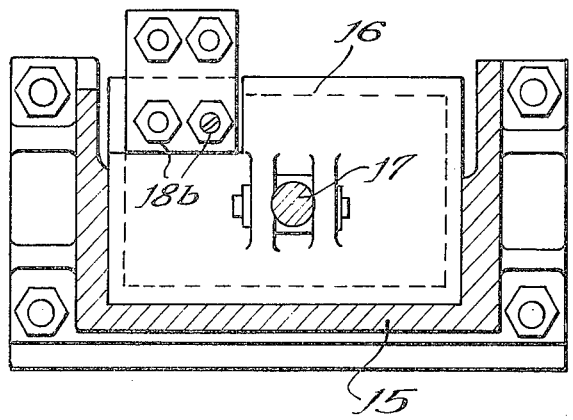
Figure 5:
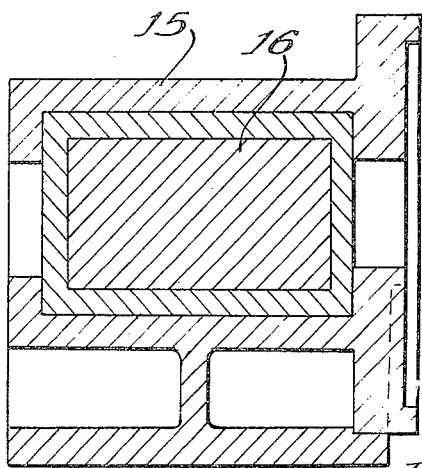
Figure 8:
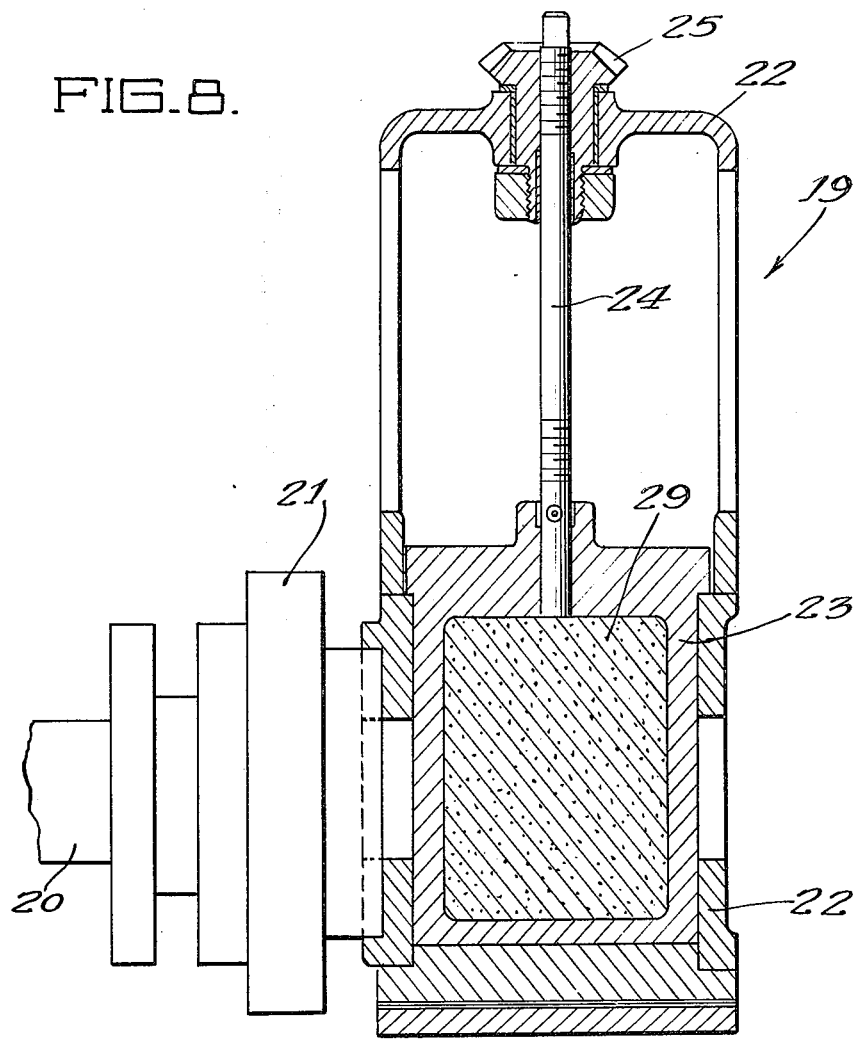

FIGS. 5 and 6 are enlarged sectional views taken on line 5—5 of FIG. 4 and line 6—6 of FIG. 3 respectively;

FIG. 7 is a cross sectional view taken on line 7—7 of FIG. 1 partly in elevation, showing the intermediate shield gates of the present invention and the operating means thereof;

FIG. 8 is an enlarged vertical sectional view taken on line 8—8 of FIG. 7; and

Figure 9:
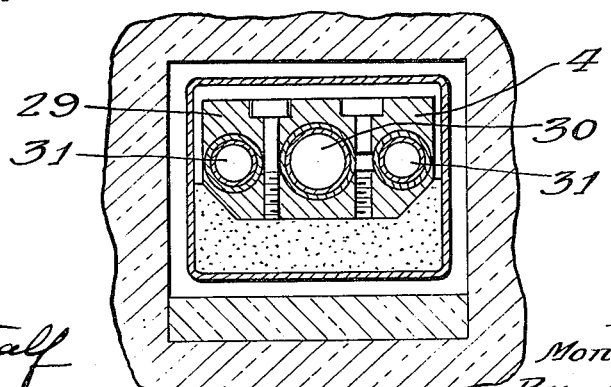

FIG. 9 is an enlarged transverse cross sectional view through one of the control rods.

Referring to the drawings, the reactor comprises a mass 1 of graphite moderator in which is disposed suitable fissionable material (not shown), all of which is enclosed in a suitable biological shield 2, or a shield of a material of sufficient radiation absorption characteristics and thickness to protect living organisms outside of it from radiation. Passages 3 extend through one shield 2 and into the mass 1 for accommodating control rods 4 and are lined with aluminum tubes of the same general cross section as the rods 4 and only slightly larger, the tubes being sealed in place to prevent escape of helium from the reactor.

The rods in the example shown are arranged in vertically spaced tiers, three rods in each tier, the tiers and the rods of each tier being spaced about five feet apart. Each rod proper contains neutron absorbing material and is water cooled. A driven means, which preferably is in the form of a rack 5, is connected fixedly to each rod in end to end relationship and is rigid with the rod and forms a linear extension thereof, the rod proper and driven means in the illustrative example forming in effect opposite end portions, respectively, of a unitary rod structure.

The driven means or rack 5 cooperates with a driving means, which includes a reversible motor driven pinion 6, for driving the rods selectively endwise in opposite directions. The rods are supported on rollers 7 which are carried on a suitable framework 8. The rods are water cooled by circulating water therethrough from suitable inlet and outlet hoses 9 carried on reels 10.

The driving means for the rods, including the pinions and motors (the motors not shown) and the water circulating fittings are shielded from the reactor by means of a shield wall 11.

The wall 11 has rod passages 12 therein and is the end wall of a room 13, the opposite wall of which is the shield 2 of the lateral face of the reactor. The room 13 is kept completely closed, except for the passages 12 in the wall 11 and the passages 3 into the reactor, access being had to the room only by a suitable shield door (not shown) which normally is kept closed and locked. The room 13 is known as the "hot room" and is of greater length, endwise of the rods, than the length of those portions of the rods which are capable of insertion into the reactor. For example, the rods illustrated can be inserted into the reactor to a depth of about 28 feet and the length of the room 13 is about 31 feet.

Consequently, upon fully withdrawing a rod which is active due to neutronic bombardment in the reactor passages 3, the active portion lies wholly within the room 13 and no active part of the rod is exposed outwardly of the wall 11. The desirability of such shielding is apparent from the fact that the rods emit about 10,000 roentgens per hour upon withdrawal from a pile of 250,000 kilowatts capacity and may not be approached safely for about a week after withdrawal.

In cross section, the passages 3 and 12 fit the cross sections of the rods 4 with very slight clearance so that, while a rod extends into the passages, the stream of neutrons issuing around the rod through the passages is substantially blocked or greatly reduced compared to the stream of neutrons which would issue from a fully open end of a passage 3 or 12. However, when a rod is fully removed from a passage 3 a stream of very high neutron and other radiations, such as gamma radiations, emanates from the passage. To prevent such direct radiations, suitable shield gates are provided.

The main shielding of the passages 3 is effected by main shield gates 14, arranged one for each passage 3. As better illustrated in FIGS. 2 through 6, each gate 14 comprises a frame 15 which is rigidly mounted directly in front of the open end of one of the passages 3. Mounted in each frame 15 is a plug 16 which is movable laterally of the axis of the associated passage 3 in a suitable guideway in the frame 15. The plug 16 has a lead portion positioned to overlie the open end of the passage 3 when the plug 16 is in closed position. The plug 16 is operated by a suitable double acting pneumatic piston 18 which is fixedly secured to the frame 15 and which moves plug 16 back and forth by means of piston rod 17, as shown in FIGS. 3, 4, and 6. Each piston 18 is individually controlled by suitable remote control valves (not shown) to move the plug 16 in front of and clear from the passages 3 selectively. Limit switches 18a are provided which are engaged by adjustable stop members 18b riding on the plug 16, the stop member 18b to the right breaking an electric circuit when the piston rod 17 is retracted causing the member to strike the limiting switch 18a to the right, thereby actuating a relay (not shown) so as to cause the retracting motion to stop, and conversely the stop member 18b to the left breaking an electrical circuit when the piston rod pushes plug 16 forward to the closed position, thereby actuating a relay (not shown) so as to cause the forward motion of piston rod 17 to stop.

In cases wherein it becomes necessary to remove a rod for service or repair, it is necessary also to prevent radiation from the "hot room" 13 out through the passages 12 where it would be dangerous to personnel directly exposed and would contaminate the operating equipment.

For this purpose, each passage 12 is provided at its inner end with an intermediate gate 19, as better illustrated in FIGS. 7 and 8.

The passages 12 are provided with suitable sleeve liners 20 and headers 21 and the gates 19 are fixed in position in front of the passages on the inner face of the wall 11.

Each gate 19 comprises a frame 22 in which a plug 23 is movable in opposite directions by a jack-screw 24. The screw 24 is operated by an internally threaded bevel gear 25 rotatably mounted in the frame 22. Each gear 25 cooperates with a driving gear 26 which is rotatable by a rotatable shaft 27, operated in turn by a detachable crank 28 from locations outside of and shielded from the room 13.

Each plug 23 is thus operable to be moved into alignment with its associated passage 12 and clear thereof, and each has a lead portion 29 for preventing the passage of radiations through its associated passage 12 when the lead portion is brought into alignment therewith.

Thus, personnel and the operating equipment are protected both from direct radiation from the rods 14 and passages 3 and from radiations from the room 13.

The wall 11 preferably is of hydrogeneous concrete and may be 5 feet or more in thickness. The other walls of the room 13 are of comparable thickness. The lead portions of the gates may be 6 inches thick in a direction lengthwise of the passages. The aforesaid dimensions will, of course, depend upon the power of the particular reactor.

As mentioned, the rods 4 are fluid cooled, and the water is circulated therethrough from hoses 9 in the apparatus or control room. To reduce radiation from the water to a minimum while affording adequate cooling of the rods 4, each rod, as illustrated in FIG. 9, preferably is formed from aluminum blocks 29 in which are enclosed a water inlet tube 30 and outlet tubes 31 which connect to inlet and outlet hoses 9, respectively. The tubes 30 and 31 are spray coated exteriorly with a layer of boron which absorbs neutrons effectively and reduces the possibility of rendering active any foreign matter which may be present in the cooling water.

Water is circulated through the tubes at a rate of about 10 gallons per minute. The activity of the rods decays very rapidly so that after about a week the rods can be approached to within a foot or so safely without exceeding a tolerance dose in 8 hours.

Having thus described the invention, what is claimed is:

I claim:

1. In combination with a neutronic reactor having a mass of moderator in which is disposed fissionable material enclosed in a biological shield of sufficient radiation absorption characteristics and thickness to protect living organisms outside it by absorbing neutrons, gamma rays and other radiation emanating from the mass, a lateral face on said biological shield having a plurality of apertures to pass only a plurality of control rods, said control rods being of equal length and comprising neutron absorbing material, said mass having passages aligned with said apertures, linear extensions on said control rods at the ends opposite to the ends disposed toward the mass, and driving means associated with said extensions adapted to impart movement to said control rods into and out of said passages in the mass, the improvement comprising a second shield of hydrogenous concrete forming a complete enclosure over said lateral face of the biological shield and having a wall parallel with said lateral face distant therefrom the length of the neutron absorbing portions of the control rods and a small part of their extensions, said parallel wall having apertures aligned with said passages in the mass to permit said extensions to pass between said complete enclosure and said driving means, shield gates comprising movable plugs mounted in front of each of the plurality of apertures in the biological shield and shield gates comprising movable plugs mounted in front of each of the apertures in the second shield, and means for moving said plugs laterally to open and close said apertures.

2. The improved structure of claim 1 wherein the second shield is at least 5 feet thick.

3. The improved structure of claim 1 wherein the passages in the mass are horizontal and the movement imparted to said extensions is horizontal.

4. The improved structure of claim 1 wherein the biological shield gates are enclosed in frames and the means for moving the plugs to open and close the apertures in the biological shield comprises double acting pneumatic pistons fixed to the frames of the gates with piston rods movably fixed to the plugs.

* * * * *